US012714031B2

(12) United States Patent
Garber et al.

(10) Patent No.: US 12,714,031 B2
(45) Date of Patent: Aug. 25, 2026

(54) ROUND BALE EJECTION MANIPULATOR

(71) Applicants: CNH Industrial America LLC, New Holland, PA (US); CNH Industrial Belgium N.V., Zedelgem (BE)

(72) Inventors: Grant Garber, Strasburg, PA (US); Shawn O'Neal, Laurel, DE (US); Geert Mortier, Ghent (BE); Kevin Smith, Narvon, PA (US)

(73) Assignees: CNH Industrial America LLC, New Holland, PA (US); CNH Industrial Belgium N.V.

( * ) Notice: Subject to any disclaimer, the term of this patent is extended or adjusted under 35 U.S.C. 154(b) by 382 days.

(21) Appl. No.: 18/231,976

(22) Filed: Aug. 9, 2023

(65) Prior Publication Data

US 2025/0048968 A1 Feb. 13, 2025

(51) Int. Cl.
*A01F 15/08* (2006.01)
*A01F 15/07* (2006.01)

(52) U.S. Cl.
CPC .......... *A01F 15/0883* (2013.01); *A01F 15/07* (2013.01); *A01F 2015/074* (2013.01); *A01F 2015/0808* (2013.01)

(58) Field of Classification Search
CPC .................. A01F 15/0883; A01F 15/07; A01F 2015/074; A01F 2015/0808
See application file for complete search history.

(56) References Cited

U.S. PATENT DOCUMENTS 7,353,753 B2 4/2008 Viaud
7,530,215 B2 5/2009 Guiet et al.
8,991,308 B2 3/2015 Roberge et al.
9,930,834 B2 4/2018 Chaney et al.
11,129,334 B2 9/2021 Gresset et al.
2006/0075736 A1* 4/2006 Viaud ..................... A01F 15/07 100/88
2012/0189417 A1* 7/2012 Blough ............... A01F 15/0883 701/49
2013/0074709 A1* 3/2013 Thompson .............. A01F 15/07 100/7

(Continued)

FOREIGN PATENT DOCUMENTS

EP 2384617 A1 11/2011
EP 2760273 A1 8/2014
EP 3338534 A1 6/2018

*Primary Examiner* — Mohammed S. Alawadi

(74) *Attorney, Agent, or Firm* — Buchanan Ingersoll & Rooney PC

(57) ABSTRACT

An agricultural crop baler having a frame, wheels, tailgate, baling chamber, ramp, and an arm attached to the frame and movable between a first position in which the arm extends along a first lateral side of the bale ejection path and does not intersect the bale ejection path, and a second position in which the arm extends along the first lateral side of the bale ejection path and intersects the bale ejection path. The baler also includes an actuator operatively connected between the frame and the arm and configured to move the arm between the first and second positions, and a control system configured to operate the actuator. A method is also provided, in which a baler arm contacts a side of the bale to generate a force on the bale in a direction transverse to the forward direction.

10 Claims, 5 Drawing Sheets

(56) References Cited

U.S. PATENT DOCUMENTS

| | | | | |
|---|---|---|---|---|
| 2013/0133530 | A1* | 5/2013 | Roberge .............. | A01F 15/0883 100/88 |
| 2019/0053434 | A1 | 2/2019 | Reijersen Van Buuren | |
| 2019/0327901 | A1 | 10/2019 | Gresset et al. | |

* cited by examiner

T
116
118
124
P
116′
140
R
142
M
138
104
138

T
118
124
116
116′
P
140
140
142
142
104
138a
138b

ROUND BALE EJECTION MANIPULATOR

FIELD OF THE INVENTION

This patent application relates to agricultural baling equipment.

BACKGROUND OF THE INVENTION

Baling machines are widely used in agriculture to bale crop material in fields into bales that may be conveniently and effectively handled, stored and used. Baling machines are known that bale forage products such as grass and other leaves used as animal feed; straw or other plant parts resulting as by-products from a harvesting operation such as combine harvesting; cotton; and other plant parts of commercial or other value. These and other materials are generically referred to herein, for the sake of simplicity, as "crop material."

A large baler may be a self-propelled machine having an engine, transmission, drive train, powered wheels, steerable wheels and an operator's cab. Other balers are configured to be towed behind an agricultural tractor that, under the control of an operator or using operator-monitored software, moves the baler about a field and provides power to operate internal parts of the baler. Power transfer is effected by way of a power take-off shaft connected to the power take-off that typically is part of the tractor, pressurized hydraulic fluid lines, electrical connections, and so on.

In operation, the baler moves about a field collecting crop material, and rolls the crop material into a tightly-compacted bale. The baler then wraps the bale in a wrap material, such as a plastic film or netting, and ejects the bale onto the ground for later collection.

After a round bale is ejected from a baler, the terrain affects the speed and direction of the bale. When ejecting on flat ground, the bale typically rolls out of the baler and comes to a stop at a generally predictable position along the baler travel path. However, when ejecting on a slope, the bale can pick up speed and change its direction of travel. A rolling bale can pick up speed and move to an inconvenient location for recovery, and present a hazard to nearby objects. To account for this problem, baler operators typically drive to a relatively flat location before ejecting the bale. This leads to increased operating time, excess fuel consumption, and generally reduced efficiency. While the foregoing problems are primarily present with round balers, square balers could conceivably suffer from similar issues.

The inventors have determined that improvements can be made to conventional agricultural balers to help mitigate or solve such problems.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural crop baler comprising: a frame; wheels rotatably mounted to the frame and configured to support the frame on a surface; a tailgate movably mounted to the frame between a closed position and an open position; a baling chamber defined between the frame and the tailgate, wherein the baling chamber is enclosed to hold a bale when the tailgate is in the closed position, and open to allow the bale to exit the baler along a bale ejection path when the tailgate is in the open position; a ramp mounted to the frame and positioned at a location below the baling chamber, wherein the ramp is positioned and configured to vertically support a bale ejected from the baling chamber along the bale ejection path; a first arm attached to the frame and movable between a respective first position in which the first arm extends along a first lateral side of the bale ejection path and does not intersect the bale ejection path, and a respective second position in which the first arm extends along the first lateral side of the bale ejection path and intersects the bale ejection path; a first actuator operatively connected between the frame and the first arm and configured to move the first arm between the respective first position and the respective second position; and a control system configured to operate the first actuator.

In another exemplary aspect, there is provided a method for operating an agricultural crop baler, the method comprising: moving the baler along a ground surface in a forward direction; forming a bale within a bale chamber of the baler; releasing the bale from the bale chamber along a bale ejection path; and operating at least one arm attached to the baler to contact a lateral side of the bale to generate a force on the bale in a transverse direction relative to the forward direction.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
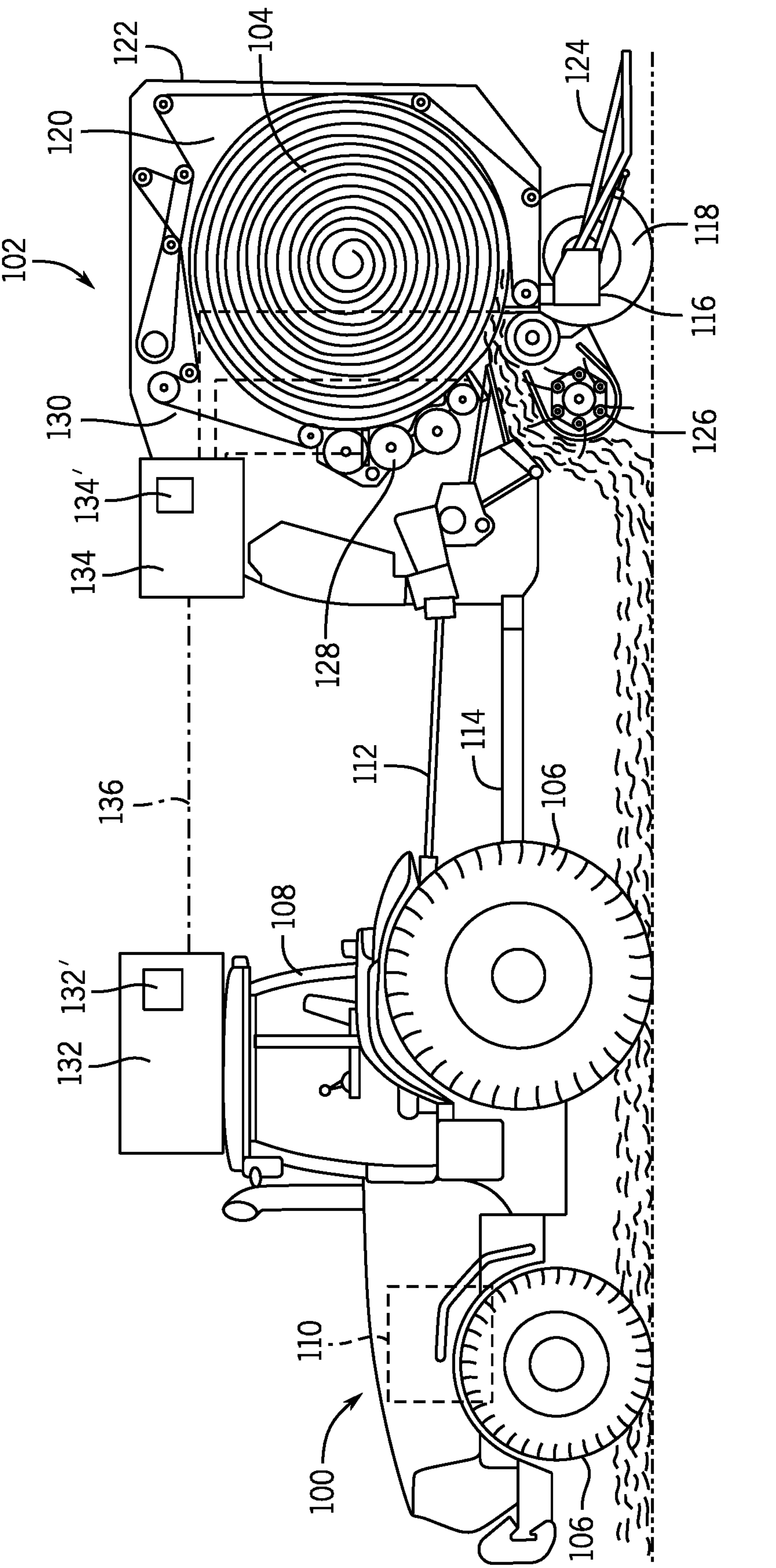
FIG. 1 illustrates a tractor and baler according to aspects of the present invention.

FIG. 1 shows an embodiment of an agricultural vehicle 100 towing an agricultural baler 102 to perform a baling operation within a field. As shown, the work vehicle 100 can be configured as an agricultural tractor 100, such as an operator-driven tractor 100 or an autonomous tractor 100. However, in some embodiments, the work vehicle 100 may correspond to any other suitable vehicle configured to tow a baler across a field or that is otherwise configured to facilitate the performance of a baling operation. The agricultural vehicle 100 also may comprise baling vehicle having the baler 102 integrated with a vehicle frame having its own ground propulsion system, operator cab, and so on.

The shown baler 102 is configured as a round baler that forms round bales 104. However, in some embodiments, baler 102 may have any other suitable configuration, including being configured to generate square or rectangular bales.

The tractor 100 generally includes wheels 106, an operator cab 108, an engine 110, and a power take-off 112 that transmits power to the baler 102. A tongue and hitch assembly 114 or other tow equipment connects the tractor 100 to the baler 102 so that the tractor 100 can pull the baler 102 across the field, as known in the art.

The baler 102 generally includes a frame 116 that is supported by wheels 118 to roll on the ground, a baling chamber 120, a tailgate 122, and a ramp 124 that is movably mounted to the frame 116 generally below the baling chamber 120 to vertically support the bale 104 as it is ejected. The baler 102 also includes conventional baling equipment, such as a crop collector 126 to lift crop material from the ground, rollers 128 and belts 130 that manipulate the crop material into a bale 104, as known in the art, and mechanisms for wrapping the bale.

The tailgate 122 is movably mounted to the frame between a closed position and an open position. When closed, the tailgate 122 and frame generally define the baling chamber 120, and the tailgate 122 (e.g., belts and other structures within the tailgate assembly) holds the bale 104 within the baling chamber 120. When the tailgate 122 is opened, the bale 104 can be ejected from the baler 102.

One or both of the tractor 100 and the baler 102 may include a respective control system 132, 134 comprising a processor, memory, a communication bus, input and output connections (wired and/or wireless), sensors, user interfaces, and the like. The memory comprises a tangible computer readable medium, such as a magnetic medium (e.g., a computer hard drive), an optical medium (e.g., an optical disc), solid-state memory (e.g., flash memory), or other storage media known in the art. Software code or instructions that are tangibly stored on the memory, and the processor can load an execute such code or instructions to perform various operating steps such as described herein, and to generally control the operation of the tractor 100 and/or baler 102. Where the tractor 100 and baler 102 have their own respective control systems 132, 134, the two control systems 132, 134 may be communicatively coupled by wired or wireless communication links 136.

It will be appreciated that any of the functionality performed by the control system(s) 132, 134 described herein, such as the methods of operation described below, is implemented in software code or instructions that are tangibly stored on the tangible computer readable medium. Upon loading and executing such software code or instructions into a processor, the control system(s) 132, 134 may perform any of the functionality of the control system(s) 132, 134 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The baler 102 is shown and described in more detail in FIGS. 2-5.

Figure 2:
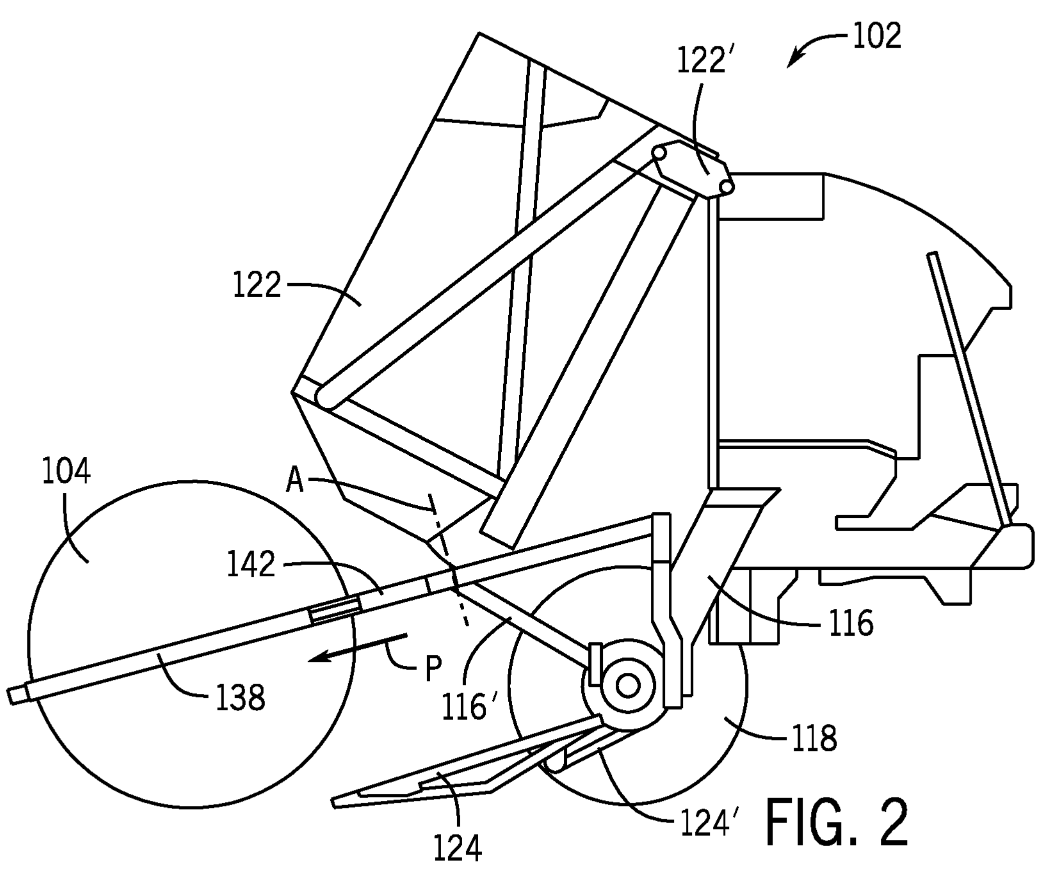
FIG. 2 is a side view of a baler shown with the tailgate partially opened.

FIG. 2 shows the baler in partial cross-section, with the bale-forming equipment removed, and the tailgate 122 partially opened. The tailgate 122 is movably mounted to the frame 116 by a horizontal tailgate pivot 122'. An actuator (not shown) is provided to raise and lower the tailgate 122, and thereby open and close the baling chamber 120, as known in the art. The ramp 124 is mounted to the frame 116 generally below the tailgate 122, where it can receive a bale 104 ejected from the baling chamber 120. The ramp 124 may be movably mounted to the frame 116. For example, one or more ramp actuators 124' may be operatively connected between the ramp 124 and the frame 116, and configured to raise and lower the ramp 124, as known in the art. In this case, the ramp actuator 124' comprises a hydraulic piston and cylinder assembly, with one end attached to the frame 116 and the other end attached to a linkage that supports the ramp 124.

The baler 102 further includes one or more arms 138 that are mounted directly or indirectly to the baler frame 116. In this case, the arms 138 are connected to frame extensions 116' that extend backwards from the wheels 118. The frame extensions 116' may be removable and/or configured to retrofit to an existing baler frame 116. The frame extensions 116' alternatively may be integral to (e.g., welded to) the remainder of the frame 116.

The arms 138 are provided at opposite lateral sides of a bale ejection path P. The bale ejection path P is the path that a properly-formed and wrapped bale 104 generally would follow in the absence of the arms 138, and when the baler 102 is operated on a level horizontal surface. The bale ejection path P is generally defined by the geometry of the baler 102 and the bale 104. For example, the shape of the baling chamber 120 and ramp 124 can define the bale ejection path P. Other variables affecting the bale ejection path P will be understood by persons of ordinary skill in the art.

In this example, the arms 138 are connected to the frame 116 via respective pivots 140. The pivots 140 are oriented along respective axes A that are generally perpendicular to the bale ejection path P, so that the arms 138 rotate towards and away from the bale ejection path P. In other embodiments, the pivots 140 may be replaced by multi-bar linkages, sliding connections, and so on.

Each arm 138 has a respective actuator 142, such as a hydraulic piston and cylinder assembly. The actuators 142 are operatively connected between the frame 116 and the respective arm 138. in other embodiments, a single actuator 142 may be provided to operate both arms 138 in unison via a linkage or the like. Other alternatives and embodiments will be apparent to persons of ordinary skill in the art in view of the present disclosure.

Each arm 138 is movable, by operation of the respective actuator 142, through a respective range of travel relative to the frame 116. In a first portion of this range of travel, the arm 138 extends along the respective lateral side of the bale ejection path P, without intersecting the bale ejection path P. In this position, no portion of the arm 138 is positioned at a location through which the bale 104 is expected to pass as the bale 104 moves directly along the bale ejection path P from the baler 102 to the ground, however, some incidental contact might occur between the bale 104 and the arm 138 due to variations in the shape of the bale 104 or the orientation or operating conditions of the baler 102. For simplicity, the range of travel in which the arm does not intersect the bale ejection path P is referred to herein as the "first position" of the arm 138. In the case of the shown example, in which the arms 138 are pivotally connected to the frame, the first position corresponds to the arm 138 being parallel to the bale ejection path P (see FIG. 3) or at a diverging angle to the bale ejection path P (see FIG. 5).

In a second portion of each arm's 138 range of travel, the arm 138 extends along the respective lateral side of the bale ejection path P, and does intersect the bale ejection path P. That is to say, at least a portion of the arm 138 is positioned at a location through which the bale 104 is expected to pass as the bale 104 moves from the baler 102 to the ground. For simplicity, the range of travel in which the arm intersects the bale ejection path P is referred to herein as the "second position" of the arm 138. In the case of the shown example, the second position corresponds to the arm 138 being at a converging angle to the bale ejection path P (i.e., the arm 138 moves towards the bale ejection path P as a function of distance from the frame 116).

The arms 138 (or a single arm 138, if only one is provided) are movable to various configurations to help control the position of the bale 104 when the bale 104 is ejected from the baler 102. For example, the arms 138 can be moved to positions to turn and/or decelerate the bale 104. It is expected that such control can enhance the ability of the baler 102 to deposit the bales 104 on pitched or uneven ground. Examples of possible arm configurations are shown in FIGS. 4 and 5.

Figures 4, 5:
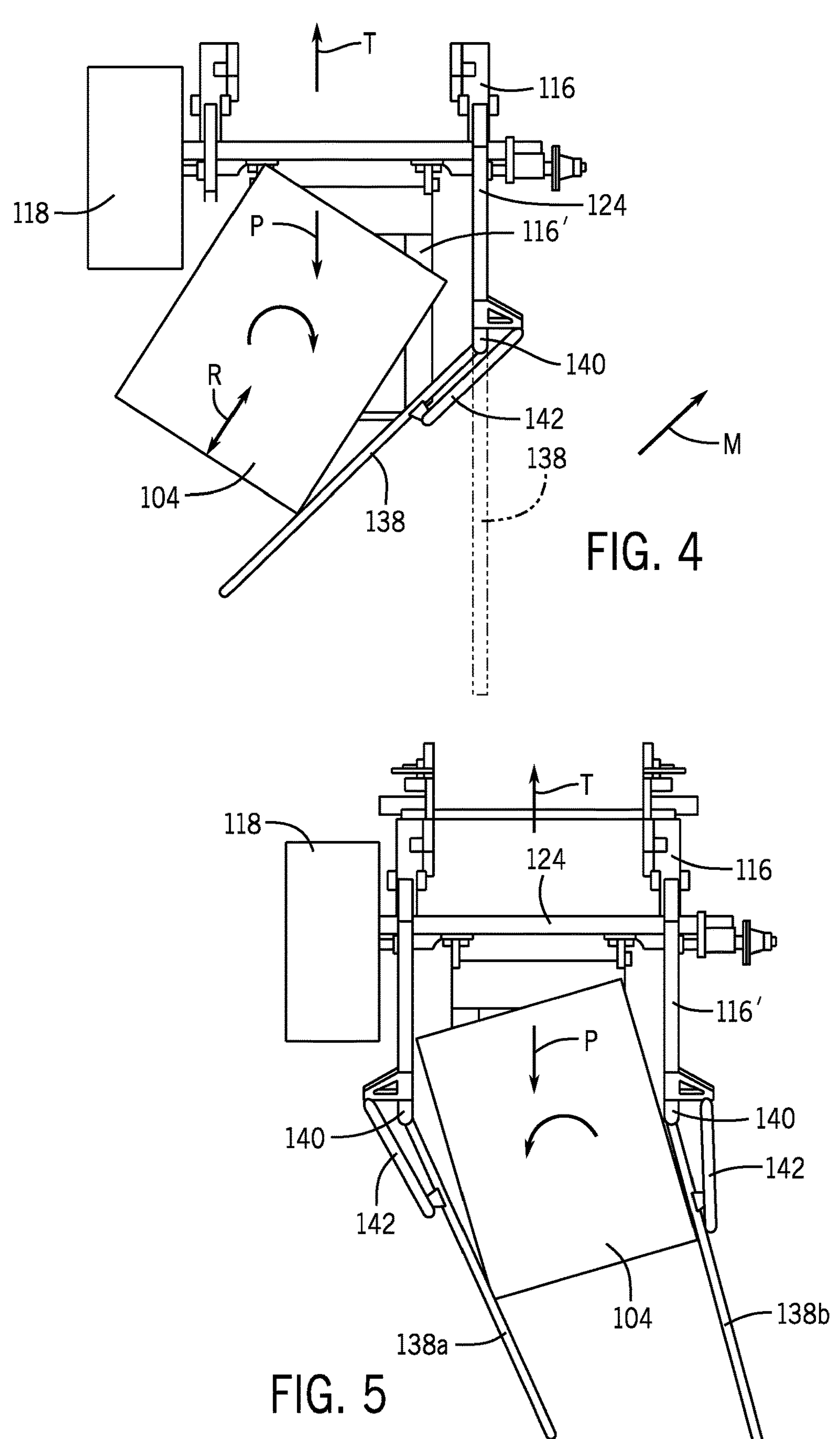
FIG. 4 is a top view of a baler having a single baler arm.
FIG. 5 is a top view of a baler having multiple baler arms operating in a first condition.

FIG. 4 shows an embodiment of a baler 102 having a single arm 138. As before, the arm 138 is connected to the frame 116 by a pivot 140, and is rotatable by operation of an actuator 142 between a first position (shown in dashed lines), and a second position. In the second position, the arm 138 intersects the bale ejection path P, so that a lateral side of the bale 104 contacts the arm 138 as the bale 104 rolls out of the baler 102. By this contact, the arm 138 generates a force on the side of the bale 104 to rotate the bale at an angle about the global vertical axis (i.e., the gravitational direction). This turns the bale 104 relative to both the bale ejection path P, and the baler's travel direction T, which is parallel to the bale ejection path P.

Turning the bale 104 in this manner is expected to provide various benefits. For example, when the baler 102 is operating on pitched ground, the bale 104 can be turned to orient the inherent rolling direction R of the bale 104 away from the maximum pitch direction M of the ground. The inherent rolling direction R is the direction in which the bale 104 least resists rolling motion, which in the case of a round bale is perpendicular to the central cylindrical axis of the bale 104. The maximum pitch direction M is the maximum angle of the slope of the ground at the location at which the bale 104 is expected to contact the ground. As will be appreciated, turning the bale 104 in this manner helps prevent the bale 104 from being pulled by gravity down the pitched ground. For example, if the maximum pitch direction M is oriented at 15 degrees to the travel direction T, the bale 104 can be turned to some degree (e.g., 15 degrees) opposite to the maximum pitch direction M to thereby inhibit the bale 104 from rolling down the pitched ground.

FIG. 5 shows an embodiment of a baler 102 having two arms located on opposite lateral sides of the bale ejection path P. In this case, the left-hand arm 138*a* is rotated to the second position to converge towards the bale ejection path P, and the right-hand arm 138*b* is rotated to a first position in which it is at a diverging angle from the bale ejection path P (i.e., the arm 138*b* extends away from the bale ejection path P as a function of distance form the frame 116). The left arm 138*a* contacts a lateral side of the bale 104 to turn the bale 104 to the left as shown by the curved arrow. The right arm 138*b* may be positioned completely out of contact with the bale 104, or it may be positioned to contact an opposite lateral side of the bale 104. When positioned to contact the opposite lateral side, the right arm 138*b* can act to better control the motion of the bale 104, such as by preventing the bale from over- or under-rotating. The second arm 138*b* also can be positioned to apply a drag load on the bale 104 by forming a passage between the arms 138*a*, 138*b* that is narrow than the width of the bale 104, to thereby slow the bale 104 as it exits the baler 102.

The arms 138 in the embodiment of FIG. 5 can also be movable to various other configurations. For example, the left arm 138*a* can be moved to a respective first position, and the right arm 138*b* can be moved to a respective second position, to direct a bale 104 to turn to the right. As another example, the left arm 138*a* and right arm 138*b* can both be moved to respective first positions to place them in an idle state.

Figure 6:
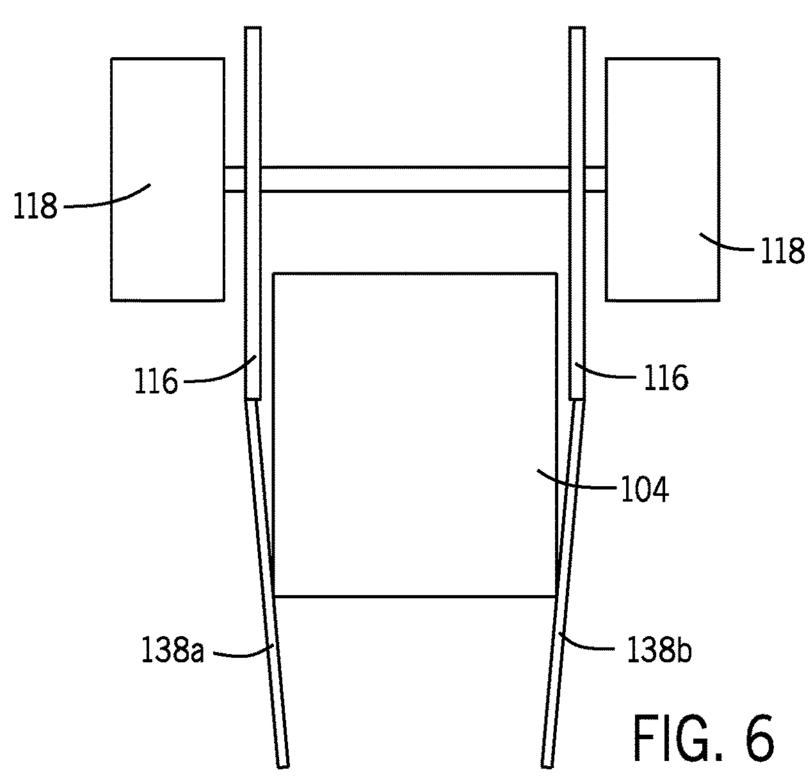
FIG. 6 is a top view of a baler having multiple arms operating in a second condition.

As shown in FIG. 6, the left and right arms 138*a*, 138*b* also may be movable so that they are both in their respective second position, and form a space between them that is narrower than the width of the bale 104. In this configuration, the arms 138*a*, 138*b* can generate a drag load to slow the bale 104 as it rolls out of the baler 102, but the arms 138*a*, 138*b* do not turn the bale 104 while doing so.

In addition to turning the bale 104, the arm or arms 138 may be used—even when not on sloped ground—to move the bale away from an obstacle (e.g., a rut or debris) located where the bale 104 otherwise would go. This operation can be enhanced by including an obstacle detector on the tractor 100 or baler 102 to identify locations to avoid.

Figure 3:
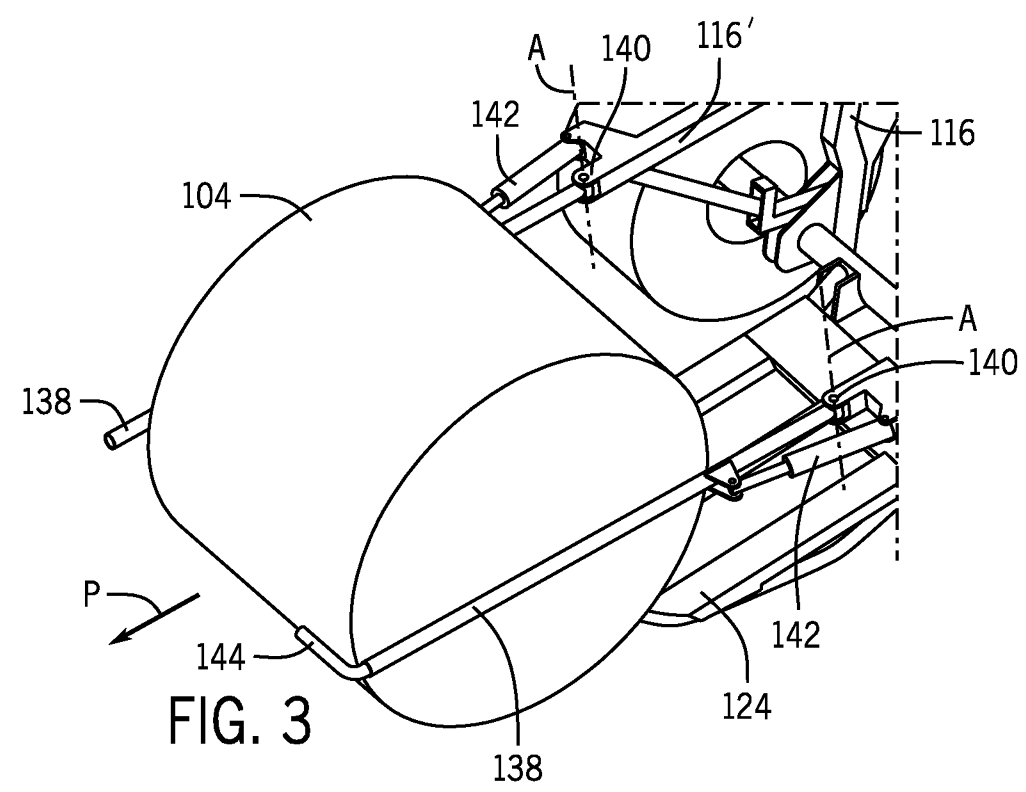
FIG. 3 is an isometric view of a baler showing baler arms in a first configuration.

As shown in FIG. 3, one or both of the arms 138 may include a hook 144. The hook 144 is a portion of the arm 138 that protrudes towards the bale ejection path P. For example, the hook 144 may be a portion at the end of the arm 138 that turns perpendicular to the remainder of the arm 138. The hook 138 may be movable, such as by being controlled by a separate actuator (not shown) to adjust the position of the hook 144 along the length of the arm (e.g., telescopically mounted), or to retract the hook (e.g., by rotating the hook 144 about the axis of the remainder of the arm 138 to extend parallel to or away from the bale ejection path P). In the shown example, the hook 144 is telescopically received in a straight tubular portion of the arm 138, and can be manually removed, repositioned or rotated out of active use. Other alternatives and embodiments will be apparent to persons of ordinary skill in the art in view of the present disclosure.

The hook 144 is positioned to contact a rear side of the bale 104. In particular, when the bale 104 rolls backwards from the baler 102, it eventually contacts the hook 144. At this point, the hook 144 may prevent the bale 104 from rolling further, which can be helpful to better control the position of the bale 104 on the ground. Such control can be enhanced by providing a hook 144 that extends across the majority of the bale 104 (i.e., across more than half of the bale's width) or by providing a hook 144 on each arm 138, which in either case allows the hook 144 or hooks 144 to be used to pull or stop the bale 104 without turning the bale 104.

The hook 144 also can be used to generate a force to turn the bale 104 opposite to the turning motion caused by the remainder of the arm 138. For example, the bale 104 may initially turn to be generally parallel to the arm 138 as the bale 104 begins exiting the baler 102, but then the hook 144 may turn the bale 104 in the opposite direction by force of the bale's momentum when the bale 104 rolls into contact with the hook 144. Such turning also can be accomplished by driving the baler 102 forward to use the hook 144 to pull one side of the bale 104. This can be useful to offset the bale 104 laterally from the travel path T to avoid an obstacle or rut on the ground or the like, while still maintaining the original rotational orientation of the bale 104. This and other operations can be enhanced by including an obstacle detector on the tractor 100 or baler 102 to identify locations to avoid.

In the case of FIG. 3, the hook 144 is statically mounted to the arm 138, but provisions may be made to account for or mitigate shock loads that might be generated as the hook 144 and bale 104 contact each other. For example, the hook 144 may be mounted on a pivot with a spring to allow the hook 144 to flex backwards to absorb shocks, or the hook 144 may be telescopically mounted to the arm 138 with a spring to bias the hook 144 forwards but allow the hook 144 to slide backwards as the bale 104 contacts it.

Figure 7:
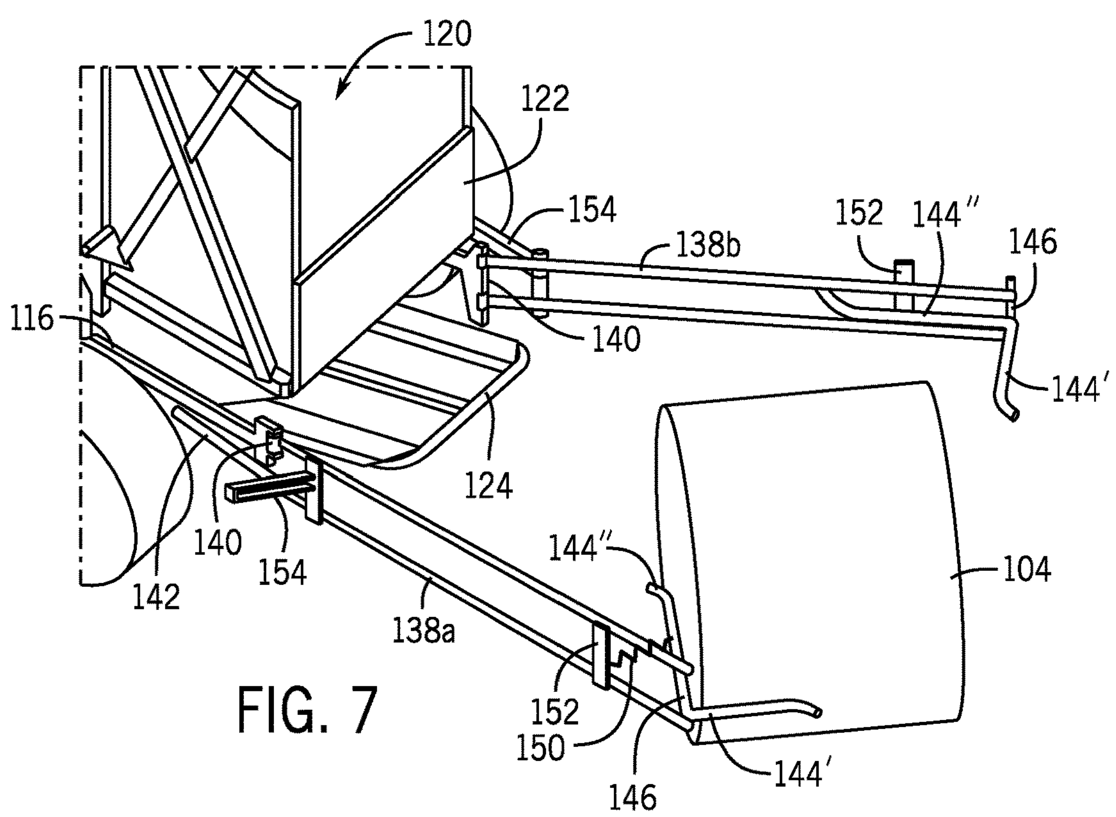
FIG. 7 is an isometric view of a baler having an embodiment of hooks at the ends of the arms.

FIG. 7 shows another embodiment of a hook 144. In this case, the hook 144 comprises a hook portion 144' and a pushbar portion 144". The hook portion 144' and pushbar portion 144" extend in the movement plane of the arm 138, and are connected to each other at corner forming preferably a right angle or greater. The corner is connected to the arm 138 by a hook pivot 146 that defines a vertical rotation axis. A spring 150 may be provided to bias the hook 144 to move the hook portion 144' perpendicular to the arm 138, with the pushbar portion 144" resting against a travel stop 152. In other cases, an actuator may be provided instead of the spring 150 to affirmatively control the motion of the hook 144 about the hook pivot 146.

In operation, the hooks 144 start with the hook portion 144' approximately perpendicular to the arm 138, and the pushbar portion 144" oriented parallel to the arm 138. In this position the pushbar portion 144" is either out of contact with the bale 104, or is positioned such that it does not significantly impede movement of the bale 104 towards the hook portion 144'. The pushbar portion 144" also may include a curved tip or other shapes to help prevent abrasive contact with the bale 104.

As the bale 104 and hook portion 144' move into contact, the bale 104 pushes the hook portion 144' backwards to rotate the hook 144 about the hook pivot 146. As this happens, the pushbar portion 144' presses against the side of the bale 104, causing the bale 104 to turn. The tip of the hook portion 144' may include a curved portion or the like to help prevent tearing or other damage to the bale 104. It has been found that this arrangement can successfully turn a bale to a new orientation as the bale 104 ejects from the baler 102, and the baler 102 resumes forward movement with the hook 144 in continued contact with the bale 104.

Other uses for a hook 144 will be apparent to persons of ordinary skill in the art in view of the present disclosure.

The arms 138 also may be movable to positions that are more suitable for transporting the baler 102 when it is not operating. For example, the actuators 142 may be operable to move the arms 134 to be generally parallel (i.e., within 20 degrees) to the back of the tailgate 122. In the example of FIG. 7, this movement is provided by attaching the actuator 142 to the arm 138 by a linkage 154 that moves the arm 138 to be flush with the back of the baler.

The arms 138 may be operated manually by an operator controlling the actuators 142, automatically by a control system 132, 134, or by a combination thereof. For simplicity the following comments describe how a controller 132 in the tractor 100 can be used to operate the arms 138, but it will be understood that the controller 132 may be replaced by a controller 134 in the baler 102, a controller located remotely (e.g., a cloud-based control system that operates based on sensors located in the baler 102), or a combination of controllers 132, 134 in the tractor 100, the baler 102, or elsewhere.

Referring to FIG. 1, the tractor 100 and/or baler 102 may include various sensors 132', 134' that provide information and feedback to the controller 132. Such sensors 132', 134' may include, for example, pitch sensors (e.g., multiple axis accelerometers), ground speed sensors (e.g., a calibrated tachometer or GPS system or the like), obstacle sensors (e.g., infrared, LIDAR, etc.), global positioning system sensors (e.g., to identify and/or control the baler 102 position and the locations of deposited bales 104), and so on. The sensors 132', 134' also may include position sensors (e.g., calibrated potentiometers) to identify the current position of each arm 138, the tailgate 122 and/or the ramp 124, and bale 104 detectors (e.g., ultrasonic or optical sensors) to identify the location of the bale 104 within the baler 102.

The controller 132 evaluates data from one or more of the sensors to determine how to operate the arms 138. For example, the controller 132 may receive pitch data from a pitch sensor to determine the angle of inclination of the tractor 100 and/or baler 102 relative to the global vertical axis, and from this derive the pitch of the ground beneath the tractor 100 and/or baler 102. The controller 132 may use this information to determine how to position the arms 138 to turn or reposition the bale 104 to reduce the likelihood that the bale 104 will be pulled downhill by gravity after the bale 104 is deposited on the ground.

As another example, in an embodiment in which the baler 102 continuously moves along the ground while the bale 102 is being ejected, the controller 132 may receive ground speed data from the tractor 100 and/or baler 102, and use this data to position the arms 138 to slow the bale 104 as it leaves the baler 102. For example, the bale 104 can be slowed by moving both arms 138 to their respective second positions to pinch the lateral sides of the bale 104.

Figure 8:
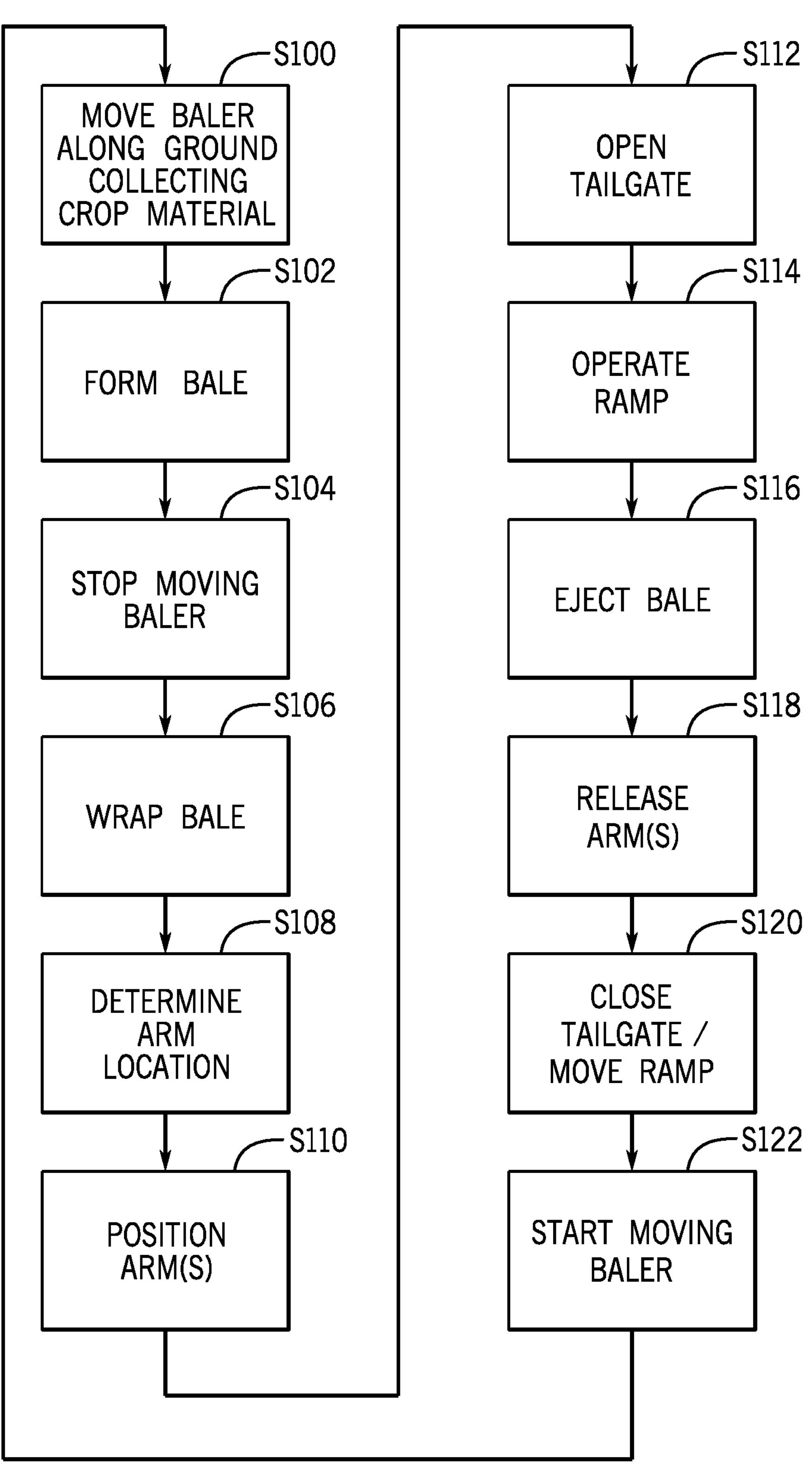
FIG. 8 is a flowchart of an embodiment of baler operation steps.

FIG. 8 illustrates an exemplary method for operating a baler 102. This method may be performed manually by an operator, by a controller 132, or by a combination thereof.

Steps S100 to S106 are generally conventional. In step S100, the baler 102 is moved along the ground while colleting crop material to form a bale 104. In step S102, the baler 102 completes forming a bale 104. In step S104, the baler is stopped. In step S106, the baler 102 is operated to wrap the bale 104.

In step 108, the operator and/or controller 132 evaluates the circumstances to determine how to position the arm or arms 138. For example, the operator or controller 132 may use feedback from a pitch sensor to determine the orientation of the baler 102, and decide how to move the arms 138 to help inhibit the bale 104 from rolling down the inclination after the bale 104 is deposited on the ground. Examples of such arm positions are described above. Upon determining the desired arm positions, the operator or controller 132 moves the arm or arms 138 to the desired position(s) in step S110.

In step S112, the tailgate 122 is opened, and in step S114, the ramp 124 is operated, such as by lifting the ramp 124 upwards, downwards or in other directions to position the ramp 124 to receive and vertically support the bale 104.

In step S116, the bale 104 is ejected from the baler 102, initially moving along the bale ejection path P. During step S116, one or both of the arms 138 contact the lateral side or sides of the bale 104 to generate forces on the bale 104. The forces are applied in the transverse direction relative to the forward travel direction T, and thereby control the movement and orientation of the bale 104, such as described above. For example one or both arms 138 may be operated to turn the bale 104 relative to a global vertical axis (e.g., to orient the bale's inherent rolling direction R away from the maximum pitch direction M), reposition the bale 104, and/or to decelerate or limit the acceleration of the bale 104 as it moves from the baler 102 to the ground.

In step S118, the arms 138 are returned to their respective first positions. In steps S120 and S122, the tailgate 122 is closed, the ramp 124 is reverted to its normal driving position, and the baler 102 is restarted to continue collecting crop material. Alternatively, the process may terminate, and the arms 138 may be moved to the transport positions to return the baler to an inter-operative storage location.

It will be appreciated that the various steps may be operated in different orders, or during overlapping times. For example, step S122 is shown following step S110, but both steps may be performed at overlapping times, or step S112 may be performed prior to step S110. Similarly, steps S108, S110 and/or S114 may commence before step S106 is complete. Other alternatives and embodiments will be apparent to persons of ordinary skill in the art in view of the present disclosure, and it is not intended for any description of step order to be limiting unless specifically stated as being performed in a particular sequence, or as is strictly necessary to achieve the final end result.

The present disclosure describes a number of inventive features and/or combinations of features that may be used alone or in combination with each other or in combination with other technologies. Such features may be used in any useful combination, and the appearance of a particular feature in combination with another particular feature in the embodiments is not intended to suggest that such features cannot be used in alternative combinations with other features. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. Also, features identified in the singular or by a specific number are not intended to be limited to a single features or the described number of features unless specifically recited as being present only in the specified quantity.

The invention claimed is:

1. An agricultural crop baler comprising:

a frame;

wheels rotatably mounted to the frame and configured to support the frame on a surface;

a tailgate movably mounted to the frame between a closed position and an open position;

a baling chamber defined between the frame and the tailgate, wherein the baling chamber is enclosed to hold a bale when the tailgate is in the closed position, and open to allow the bale to exit the agricultural crop baler along a bale ejection path when the tailgate is in the open position;

a ramp mounted to the frame and positioned at a location below the baling chamber, wherein the ramp is positioned and configured to vertically support a bale ejected from the baling chamber along the bale ejection path;

a first arm attached to the frame and movable between a respective first position in which the first arm extends along a first lateral side of the bale ejection path and does not intersect the bale ejection path, and a respective second position in which the first arm extends along the first lateral side of the bale ejection path and intersects the bale ejection path;

a first actuator operatively connected between the frame and the first arm and configured to move the first arm between the respective first position and the respective second position; and a control system configured to operate the first actuator.

2. The agricultural crop baler of claim 1, wherein the first arm is pivotally attached to the frame;

the first arm is oriented parallel to or at a diverging angle to the bale ejection path in the respective first position; and the first arm is oriented at a converging angle to the bale ejection path in the respective second position.

3. The agricultural crop baler of claim 1, further comprising:

a second arm attached to the frame and movable between a respective first position in which the second arm extends along a second lateral side of the bale ejection path and does not intersect the bale ejection path, and a respective second position in which the second arm extends along the second lateral side of the bale ejection path and intersects the bale ejection path, wherein the second lateral side of the bale ejection path is opposite the first lateral side of the bale ejection path along a horizontal direction; and a second actuator operatively connected between the frame and the second arm and configured to move the second arm between the respective first position and the respective second position.

4. The agricultural crop baler of claim 3, wherein the control system is configured to operate the second actuator.

5. The agricultural crop baler of claim 4, wherein the control system is configured to operate the first actuator and the second actuator to place the first arm and the second arm into at least one of:

a configuration in which the first arm is in the respective first position; and the second arm is in the respective second position, and a configuration in which the first arm is in the respective second position and the second arm is in the respective first position.

6. The agricultural crop baler of claim 4, wherein the control system is configured to operate the first actuator and the second actuator to place the first arm and the second arm into a configuration in which the first arm is in the respective second position and the second arm is in the respective second position.

7. The agricultural crop baler of claim 1, wherein the first arm is movable relative to the frame to a stowed position in which the arm extends generally parallel to a portion of the tailgate or frame.

8. The agricultural crop baler of claim 1, wherein the first arm comprises a hook extending from a location along the first arm towards the bale ejection path and configured to contact a rear side of the bale ejected along the bale ejection path when the first arm is in the respective second position.

9. The agricultural crop baler of claim 8, wherein the hook comprises a hook portion and a pushbar portion oriented at an angle to each other and pivotally mounted to the first arm to rotate about a vertical axis at a hook pivot, and wherein the hook portion is configured to be contacted by the bale ejected along the bale ejection path, and the pushbar portion is configured to contact a side of the bale upon rotation of the hook about the hook pivot.

10. The agricultural crop baler of claim 1, further comprising at least one of:

a pitch sensor configured to determine a pitch of the agricultural crop baler relative to a global vertical axis, and wherein the control system is configured to operate the first actuator based upon the determined pitch; and a ground speed sensor configured to determine a ground speed of the agricultural crop baler, and wherein the control system is configured to operate the first actuator based upon the determined ground speed.

* * * * *